US011386531B2

(12) United States Patent
Kalinin et al.

(10) Patent No.: US 11,386,531 B2
(45) Date of Patent: Jul. 12, 2022

(54) METHOD FOR DECONVOLVING IMAGE DATA

(71) Applicant: Carl Zeiss Microscopy GmbH, Jena (DE)

(72) Inventors: Stanislav Kalinin, Weimar (DE); Volodymyr Kudryavtsev, Jena (DE); Yauheni Novikau, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 336 days.

(21) Appl. No.: 16/804,327

(22) Filed: Feb. 28, 2020

(65) Prior Publication Data
US 2020/0294204 A1 Sep. 17, 2020

(30) Foreign Application Priority Data

Mar. 14, 2019 (DE) ...................... 10 2019 203 449.7

(51) Int. Cl.
*G06K 9/40* (2006.01)
*G06T 5/00* (2006.01)
*G02B 21/00* (2006.01)

(52) U.S. Cl.
CPC .......... *G06T 5/003* (2013.01); *G02B 21/0032* (2013.01); *G02B 21/0072* (2013.01); *G02B 21/0084* (2013.01)

(58) Field of Classification Search
CPC .......... G06T 5/003; G06T 5/001; G06T 5/00; G06T 5/50; G02B 21/0032;

(Continued)

(56) References Cited

U.S. PATENT DOCUMENTS 7,633,053 B2 12/2009 Wolleschensky et al.
2003/0230710 A1 12/2003 Wolleschensky et al.
(Continued)

FOREIGN PATENT DOCUMENTS

EP 1 372 011 11/2006

OTHER PUBLICATIONS

Huff, et al., "The Airyscan detector from ZEISS—Confocal imaging with Improved Signal-to-Noise Ratio and Superresolution," Technology Note EN_41_013_105; Carl Zeiss Microscopy GmbH, Jul. 2015 (19 pages).

(Continued)

*Primary Examiner* — Arnel C Lavarias
(74) *Attorney, Agent, or Firm* — Grüneberg and Myers PLLC

(57) ABSTRACT

In a method for deconvolving image data, image data of an object are captured with a number n of confocal beam paths. The image data are converted into resultant image data by means of a point spread function. The resultant image data are deconvolved again in the frequency domain using a deconvolution function, wherein the deconvolution function contains the formation of at least a number n of sum terms and a Wiener parameter w. The results of the sum terms are stored in retrievable fashion; the Wiener parameter W is modified at least once proceeding from its original value and the deconvolution is carried out by means of the deconvolution function with the modified Wiener parameter w and the stored results of the sum terms.

15 Claims, 2 Drawing Sheets

(58) Field of Classification Search
CPC .............. G02B 21/0072; G02B 21/0084;
G02B 21/00; G02B 21/0004; G02B
21/002; G02B 21/0024; G02B 21/0052;
G02B 21/0076; G02B 21/008; G02B
21/06; G02B 21/36; G02B 21/361; G02B
21/365
USPC ........ 382/255, 260, 275, 279, 280; 359/362,
359/363, 368, 369, 385, 388
See application file for complete search history.

(56) References Cited

U.S. PATENT DOCUMENTS

| | | | |
|---|---|---|---|
| 2013/0266241 | A1* | 10/2013 | Ranalli ............... G06T 5/50 382/280 |
| 2018/0196245 | A1* | 7/2018 | Kleppe .............. G02B 21/0076 |
| 2020/0116987 | A1* | 4/2020 | Kleppe .............. G02B 21/0064 |
| 2021/0373306 | A1* | 12/2021 | Bathe ................ G02B 21/0032 |

OTHER PUBLICATIONS

Klaus Weisshart, "The Basic Principle of Airyscanning," Technology Note EN_41_013_084; Carl Zeiss Microscopy GmbH, Jul. 2014 (22 pages).

Search Report issued Jul. 20, 2020 in European Application No. 20160535.9, 8 pages.

J. McLoone, "*10 Tips for Writing Fast Mathematica Code*," Wolfram Blog, Dec. 7, 2011, 10 pages, https://web.archive.org/web/20120107201356/https://blog.wolfram.com/2011/12/07/10-tips-for•writing•fast•mathematica-code/, obtained from the internet Jul. 9, 2020.

* cited by examiner

METHOD FOR DECONVOLVING IMAGE DATA

CROSS-REFERENCE TO RELATED APPLICATIONS

This application claims the benefit of German Application No. DE102019203449.7, filed on Mar. 14, 2019, the entirety of which is incorporated herein by reference.

BACKGROUND OF THE INVENTION

Field of the Invention

The invention relates to a method for deconvolving image data.

Description of Related Art

When confocal microscopy methods are applied, a stop, which is referred to as a pinhole, is usually disposed in a conjugate image plane of a detection beam path, as is known from EP 1 372 011 B1, for example. The entirety of EP 1 372 011 B is incorporated herein by reference.

When capturing image data of an object 1, beams of detection radiation are captured by means of an optical system 2 and guided onto a detector 4 disposed downstream of the pinhole 3 (FIG. 2). Here, the image data are modified on account of optical properties of the elements of the optical system 2 and may also, for example, entail a "smearing" of the location of a signal source that brings about the detection radiation, in addition to a loss of components of the detection radiation. Further, conventional optical systems 2 do not allow a punctiform radiation source to be imaged exactly as one point again if the latter is smaller than the optical resolution of the optical system 2.

The effects of an optical system on the transmitted detection radiation can be described by means of a point spread function (PSF). This influence on the detection radiation—and hence on the resultant image data—which is also known as convolution can be undone again by means of a computational operation referred to as deconvolution should the PSF be known.

FIG. 1 schematically illustrates the relationship between the capture of image data in the spatial domain $O(r)$, the corresponding point spread function $EH(r)$, also abbreviated PSF below, and the resultant image data $D(r)$.

The corresponding quantities in the frequency domain are the object spectrum $O(\omega)$, the optical transfer function $EH(\omega)$ and the image spectrum $D(\omega)$.

The data and functions of the spatial domain and frequency domain can be converted into one another by means of the Fourier transform FT and the inverse Fourier transform $FT^{-1}$.

Therefore, an image obtained by means of confocal microscopy is the result of a convolution of the detection radiation corresponding to the PSF in the spatial domain. Additive noise [$N(r)$] likewise contributes to the resultant image data and hence to the image obtained and, when necessary, must be reduced by additional evaluation measures.

In a development of this principle of microscopy (FIG. 3), a detector 4 with a number of two-dimensionally disposed detector elements 5 (Airy scan detector) is disposed in the conjugate image plane 7 instead of a pinhole. Here, each detector element 5 acts independently as a pinhole. Here, e.g., a light-guiding fiber 6 or any other light-guiding structure 6 whose input lies in the conjugate image plane 7 may be disposed upstream of each detector element 5. Airy scanning microscopy is based on this principle (see e.g., Weisshart, K. 2014; The basic principle of Airyscanning; Technology Note EN_41_013_084; Carl Zeiss Microscopy GmbH, the entirety of which is incorporated herein by reference; and Huff, J. et al. 2015; The Airy detector from ZEISS—Confocal imaging with improved signal-to-noise ratio and superresolution; Technology Note EN_41_013_105; Carl Zeiss Microscopy GmbH, the entirety of which is incorporated herein by reference).

By way of example, if a detector with n=1 detector elements or an Airy scan detector with a number n≥2 (i=2, 3, 4, . . . , n) of detector elements is used, the resultant image data $D_i(r)$ of each individual detector element in the spatial domain emerge from:

$$D_i(r) = O(r) \otimes EH_i(r) + N(r). \quad \text{Equation (1)}$$

Here, i is an index of i=1, 2, 3, . . . , n. The term $N(r)$ represents the noise.

Applying accordingly in the frequency domain is $$D_i(\omega) = O(\omega) \cdot EH_i(\omega) + N(\omega). \quad \text{Equation (2)}$$

There can be deconvolution of the resultant image data $D_i(r)$ in the frequency domain by virtue of the resultant image data $D_i(r)$ including the noise $N(r)$ being converted into the image spectrum $D_i(\omega)$ by means of a Fourier transform FT.

So as to obtain a deconvolution of the resultant image data $D_i(r) + N(r)$ back to the image data $O(r)$ when using a multiplicity of detector elements, a weighted mean was introduced in order to take into account the different transfer behavior, i.e., the individual PSFs, and in order to optimize the signal-to-noise ratio (SNR) (see Equation 3; see e.g., Weisshart, K. 2014; The basic principle of Airyscanning; Technology Note EN_41_013_084; Carl Zeiss Microscopy GmbH; and Huff, J. et al. 2015; The Airy detector from ZEISS—Confocal imaging with improved signal-to-noise ratio and superresolution; Technology Note EN_41_013_105; Carl Zeiss Microscopy GmbH). A deconvolution of the resultant image data $D_i(\omega)$ of all detector elements is implemented under the application of linear Wiener filtering or Wiener deconvolution according to $$O(\omega) = \frac{\sum_i^n (D_i(\omega) \cdot EH_i^*(\omega))}{w + \sum_i^n |EH_i(\omega)|^2} \quad \text{Equation (3)}$$

where
$O(\omega)$ = an object spectrum;
$D_i(\omega)$ = an image spectrum;
$EH_i^*(\omega)$ = an optical transfer function (complex conjugate, represents a phase correction);
$EH_i(\omega)$ = an optical transfer function;
n = a number of detector elements; and
i = a running index of a number of confocal beam paths.

The parameter w is the Wiener parameter. Wiener filtering allows the reduction of the disadvantageous contribution of the noise in a manner known per se. Filtering as per Equation 3 is a non-iterative process; this means that the Wiener parameter is set and remains constant (see, e.g., Huff, J. et al. 2015; The Airy detector from ZEISS—Confocal imaging with improved signal-to-noise ratio and superresolution; Technology Note EN_41_013_105; Carl Zeiss Microscopy GmbH; page 8).

This procedure requires high computational capacity and correspondingly long computational times or correspondingly fast processors. The quality of the result of the deconvolution is correspondingly impaired in the case of a Wiener parameter w not set in optimal fashion.

BRIEF SUMMARY OF THE INVENTION

A method for deconvolving image data that is improved in comparison with the related art is proposed.

The object is achieved by a method according to several embodiments. Advantageous developments are the subject matter of particular embodiments.

DETAILED DESCRIPTION OF THE INVENTION

Figure 1:
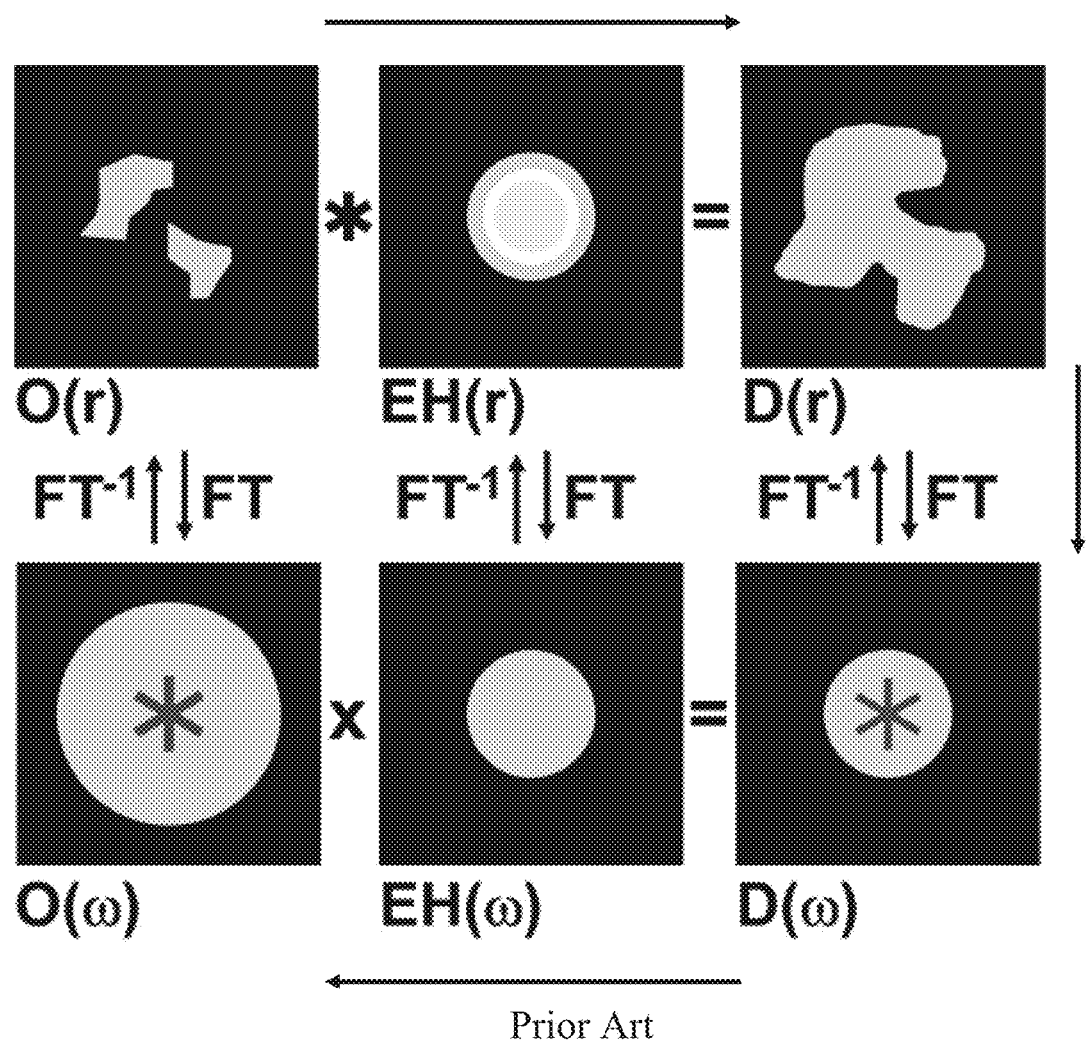
FIG. 1 schematically illustrates the relationship between the capture of image data in the spatial domain O(r), the corresponding point spread function EH(r), and the resultant image data D(r).
Figure 2:
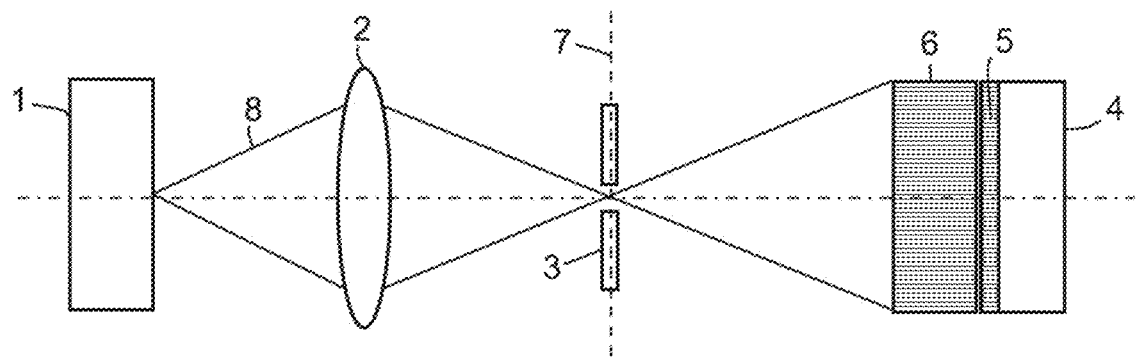
FIG. 2 schematically illustrates a confocal detection beam path having a pinhole in a conjugate plane and a detector having n detector elements and a light-guiding element in front of each detector element.

When carrying out the method for deconvolving image data, image data of an object 1 are captured by a number n of confocal beam paths 8 and a number n of detector elements 5 or a number n of detectors 4 (see for example FIG. 2). The image data are converted into resultant image data in accordance with a point spread function. The resultant image data obtained thus are then deconvolved again in the frequency domain using a deconvolution function. Here, the deconvolution function necessitates the formation of at least a number n of sum terms.

Moreover, the deconvolution function contains a Wiener parameter w, which as a correction variable serves for the purposes of reducing noise.

In a possible configuration of the method, the latter can have the following form:

$$w = \frac{\langle |N(\omega)|^2 \rangle}{\langle |O(\omega)|^2 \rangle}$$

Here, N(w) is the noise spectrum and O(ω) is the object spectrum

According to embodiments of the invention, the results of the number n of terms $\Sigma_i^n |EH_i(\omega)|^2$ and $\Sigma_i^n (D_i(\omega) \cdot EH^*_i(\omega))$ (see Equation 2) are stored in repeatedly retrievable fashion. Proceeding from a previously set original value, the Wiener parameter w is modified at least once and the deconvolution is carried out by means of the deconvolution function with the modified Wiener parameter w. Here, the stored results of the terms are retrieved and the deconvolution is carried out using these retrieved results.

The point spread function is a property of the respective optical system. Each of the confocal beam paths has an individual PSF in the spatial domain or an individual optical transfer function in the frequency domain. Converting the image data into resultant image data on the basis of the PSF is therefore a process that is inherent to the respective confocal beam path and passive.

Figure 3:
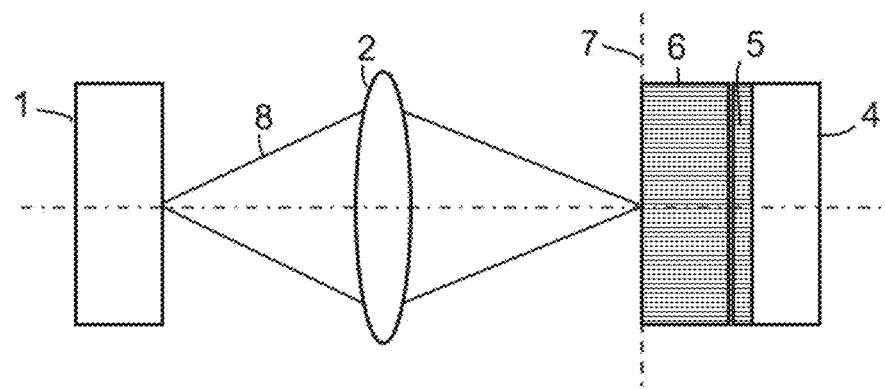
FIG. 3 schematically illustrates n confocal detection beam paths of a detector having n detector elements and a light-guiding fiber or a light-guiding element whose input lies in the conjugate image plane in front of each detector element.

By way of example, a confocal beam path 8 is present if a so-called Airy scan detector 4 is disposed in a conjugate image plane 7 in a detection beam path (FIG. 3). Each beam path to a detector element 5, possibly with optical fibers 6 disposed upstream of the detector elements 5 in each case, represents a dedicated confocal beam path within the meaning of this description.

The core of embodiments of the invention lies in the improvement of the above-described deconvolution method by virtue of particularly computationally intensive steps being reduced and the deconvolution method being designed to be more effective. Additionally, embodiments of the invention open up the possibility of efficiently selecting the Wiener parameter w within the scope of an iterative approximation in order to be able to take better account of the noise resulting from all individual confocal beam paths than in the related art, where the value of the Wiener parameter w is set once.

In an advantageous configuration of the method according to embodiments of the invention, the results of the computationally intensive terms $(\Sigma_i^n (D_i(\omega) \cdot EH^*_i(\omega)))$ and $(\Sigma_i^n |EH_i(\omega)|^2)$ are ascertained once and stored as sum terms in repeatedly retrievable fashion in a memory unit. These sum terms need not be calculated again for a second and every further iteration of the Wiener parameter w. All that has to be performed in each iteration is adding the respective Wiener parameter w to the sum term of the denominator and forming the quotient as per Equation 3, and also the inverse Fourier transform of the object spectrum $[O(r)=FT^{-1}(O(\omega))]$.

The advantages of embodiments of the method become particularly evident using the example of an Airy scan detector with 32 detector elements, for example.

The procedure of the deconvolution according to the related art and using Equation 3 necessitates Fourier transforms of the resultant image data D(r) from the spatial domain into the frequency domain: D(ω)=FT(D(r)). The respective PSF (EH_i(r)) must be ascertained in advance for each confocal beam path. Moreover, the optical transfer functions are calculated from the respective PSF by means of Fourier transforms: EH(ω)=FT(EH(r)). Therefore, a total of 64 Fourier transforms (32×FT(D(r) and 32×FT(EH(r)) are required for a predetermined Wiener parameter w. Moreover, the sum terms $(\Sigma_i^n (D_i(\omega) \cdot EH^*_i(\omega)))$ and $(\Sigma_i^n |EH_i(\omega)|^2)$ should be calculated in each case. So as to convert the obtained object spectrum O(ω) back into the image data O(r) in the spatial domain, there still is a need for an inverse Fourier transform $[O(r)=FT^{-1}(O(\omega))]$. According to the related art, all calculations have to be carried out again if there is a modification of the Wiener parameter w.

Depending on the number n of confocal beam paths, the required computational time is reduced by a factor of 4 to 30 by means of the method according to embodiments of the invention. The computation time for each iteration is reduced to a few seconds for a typical image (SizeX=2000, SizeY=2000, SizeZ=75) captured by means of an Airy scan detector (Airy scan). Consequently, an optimum value for the Wiener parameter w can be ascertained in efficient fashion.

The method according to embodiments of the invention advantageously facilitates modification of the Wiener parameter w with little computational outlay. An incremental adaptation and optimization of the Wiener parameter w is likewise possible in a significantly more efficient manner.

This advantage of the method according to embodiments of the invention is particularly evident with large amounts of data.

The invention claimed is:

1. A method for deconvolving image data (D(r)), the method comprising:
    capturing image data (O(r)) of an object with at least one confocal beam path and at least one detector element;
    converting the image data (O(r)) into resultant image data (D(r)) with a point spread function (EH(r)); and
    deconvolving the resultant image data (D(r)) again in a frequency domain using a deconvolution function,
    wherein the deconvolution function necessitates formation of at least a number n of sum terms;
    the deconvolution function contains a Wiener parameter (w) as correction variable;
    results of the sum terms are stored in retrievable fashion;
    the Wiener parameter (w) is modified at least once proceeding from its original value, thereby obtaining a modified Wiener parameter; and
    the deconvolving is carried out with the deconvolution function with the modified Wiener parameter (w) and the stored results of the sum terms.

2. The method according to claim 1, wherein the deconvolution function is $$O(\omega) = \frac{\sum_i^n (D_i(\omega) \cdot EH_i^*(\omega))}{w + \sum_i^n |EH_i(\omega)|^2}$$

wherein
    $O(\omega)$ is an object spectrum,
    $D(\omega)$ is an image spectrum,
    $EH^*(\omega)$ is an optical transfer function (complex conjugate),
    $EH_i(\omega)$ is an optical transfer function,
    n is a number of detector elements, and
    i is a running index from 1 to n.

3. The method according to claim 2,
    wherein a number n of confocal beam paths is at least 2,
    wherein the number n of confocal beam paths equals the number n of detector elements, and
    image data of each confocal beam path are captured individually by respectively one detector element.

4. The method according to claim 3, wherein results of the terms ($\sum_i^n (D_i(\omega) \cdot EH_i^*(\omega))$) and ($\sum_i^n |EH_i(\omega)|^2$) are stored in retrievable fashion as the results of the sum terms.

5. The method according to claim 1, wherein the Wiener parameter w has the form $$w = \frac{\langle |N(\omega)|^2 \rangle}{\langle |O(\omega)|^2 \rangle}.$$

6. The method according to claim 3, wherein a detector with a two-dimensional arrangement of the n detector elements is used to capture the resultant image data, wherein the detector is disposed in a conjugate image plane of the confocal beam path.

7. The method according to claim 6, wherein n is at least 32.

8. The method according to claim 6, wherein a light-guiding fiber or light-guiding structure is disposed upstream of each detector element.

9. The method according to claim 6, wherein the detector is an Airy scan detector.

10. A method for reducing required computational time for deconvolving image data (D(r)), the method comprising:
    capturing image data (O(r)) of an object with at least one confocal beam path and at least one detector element;
    converting the image data (O(r)) into resultant image data (D(r)) with a point spread function (EH(r)); and
    deconvolving the resultant image data (D(r)) again in a frequency domain using a deconvolution function,
    wherein the deconvolution function necessitates formation of at least a number n of sum terms;
    the deconvolution function contains a Wiener parameter (w) as correction variable;
    results of the sum terms are stored in retrievable fashion;
    the Wiener parameter (w) is modified at least once proceeding from its original value, thereby obtaining a modified Wiener parameter; and
    the deconvolving is carried out with the deconvolution function with the modified Wiener parameter (w) and the stored results of the sum terms.

11. The method according to claim 10, wherein the required computational time is reduced, as compared to a method wherein the Wiener parameter is set and remains constant, by a factor of from 4 to 30.

12. The method according to claim 10,
    wherein a number n of confocal beam paths is at least 2,
    wherein the number n of confocal beam paths equals a number n of detector elements,
    wherein image data of each confocal beam path are captured individually by respectively one detector element,
    wherein a detector with a two-dimensional arrangement of the n detector elements is used to capture the resultant image data, and
    wherein the detector is disposed in a conjugate image plane of the confocal beam path.

13. The method according to claim 12, wherein n is at least 32.

14. The method according to claim 12, wherein a light-guiding fiber or light-guiding structure is disposed upstream of each detector element.

15. The method according to claim 12, wherein the detector is an Airy scan detector.

* * * * *

UNITED STATES PATENT AND TRADEMARK OFFICE
CERTIFICATE OF CORRECTION

PATENT NO. : 11,386,531 B2
APPLICATION NO. : 16/804327
DATED : July 12, 2022
INVENTOR(S) : Kalinin et al.

It is certified that error appears in the above-identified patent and that said Letters Patent is hereby corrected as shown below:

In the Specification

Column 4, Line 45:
"(32×FT(D(r) and 32×FT(EH(r)))",
And should be:
-- (32×FT(D(r)) and 32×FT(EH(r))) --.

Signed and Sealed this
Fifteenth Day of November, 2022

Katherine Kelly Vidal
*Director of the United States Patent and Trademark Office*